(No Model.) 5 Sheets—Sheet 1.
S. H. STOTT.
APPARATUS FOR DIFFUSING UPON PLANTS FERTILIZING, INSECT DESTROYING, OR OTHER COMPOUNDS IN LIQUID FORM.
No. 441,989. Patented Dec. 2, 1890.
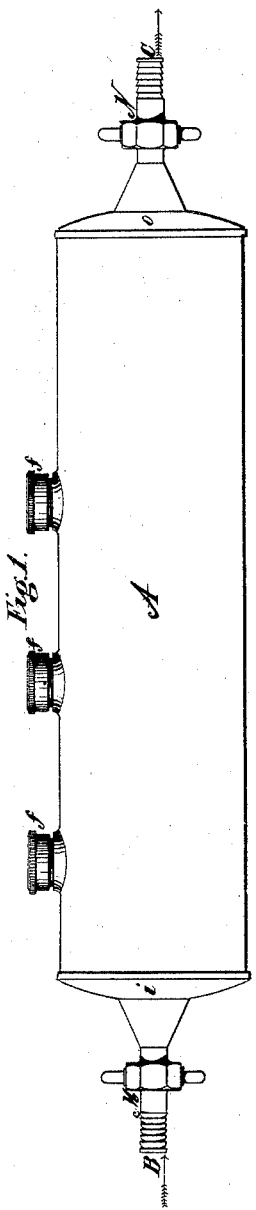
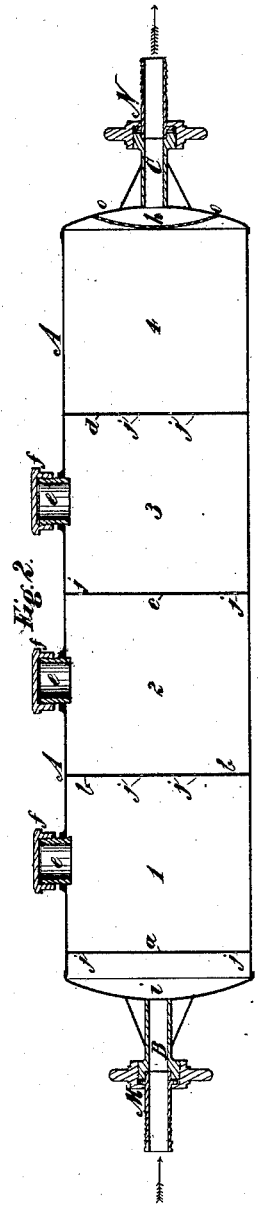
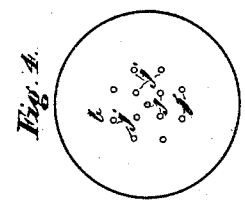
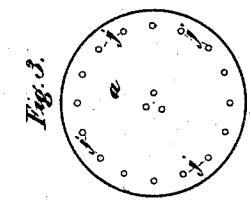
Witnesses.
Galis W. Booth.
John Sanderson.
Inventor.

(No Model.) 5 Sheets—Sheet 2.
S. H. STOTT.
APPARATUS FOR DIFFUSING UPON PLANTS FERTILIZING, INSECT DESTROYING, OR OTHER COMPOUNDS IN LIQUID FORM.
No. 441,989. Patented Dec. 2, 1890.
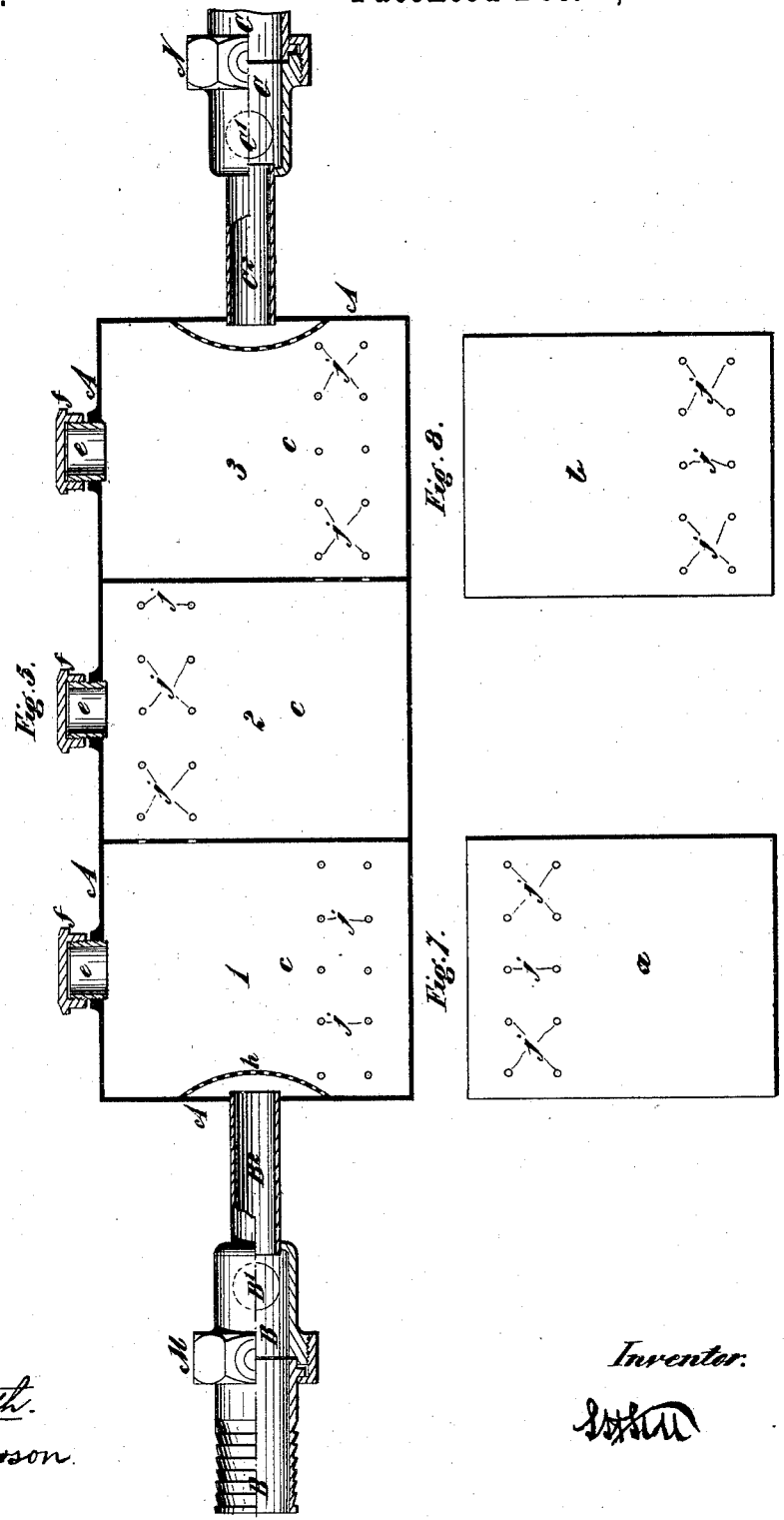
Witnesses.
Galists Booth.
John Sanderson.
Inventor:

(No Model.) 5 Sheets—Sheet 3.
S. H. STOTT.
APPARATUS FOR DIFFUSING UPON PLANTS FERTILIZING, INSECT DESTROYING, OR OTHER COMPOUNDS IN LIQUID FORM.
No. 441,989. Patented Dec. 2, 1890.
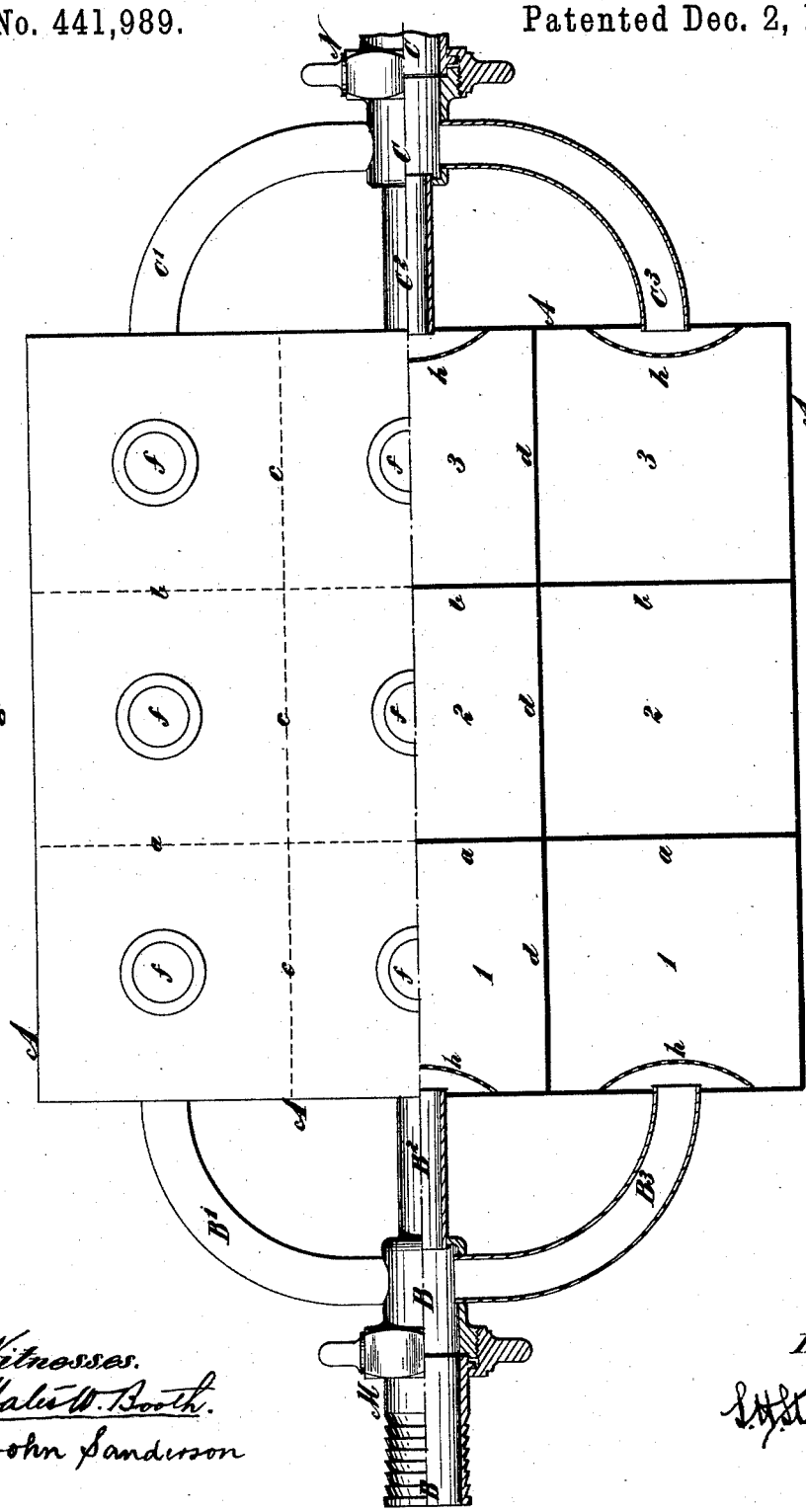

(No Model.) 5 Sheets—Sheet 4.
S. H. STOTT.
APPARATUS FOR DIFFUSING UPON PLANTS FERTILIZING, INSECT DESTROYING, OR OTHER COMPOUNDS IN LIQUID FORM.
No. 441,989. Patented Dec. 2, 1890.
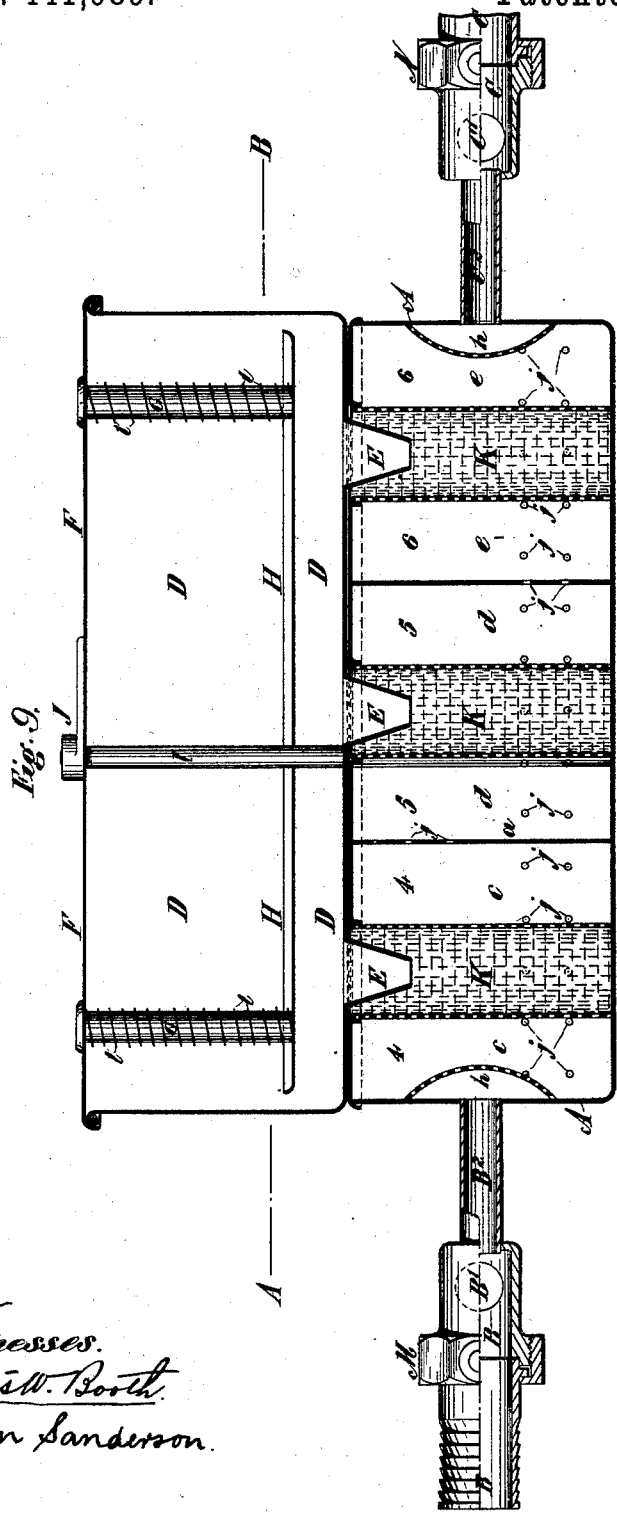
Witnesses.
Gales W. Booth
John Sanderson.
Inventor

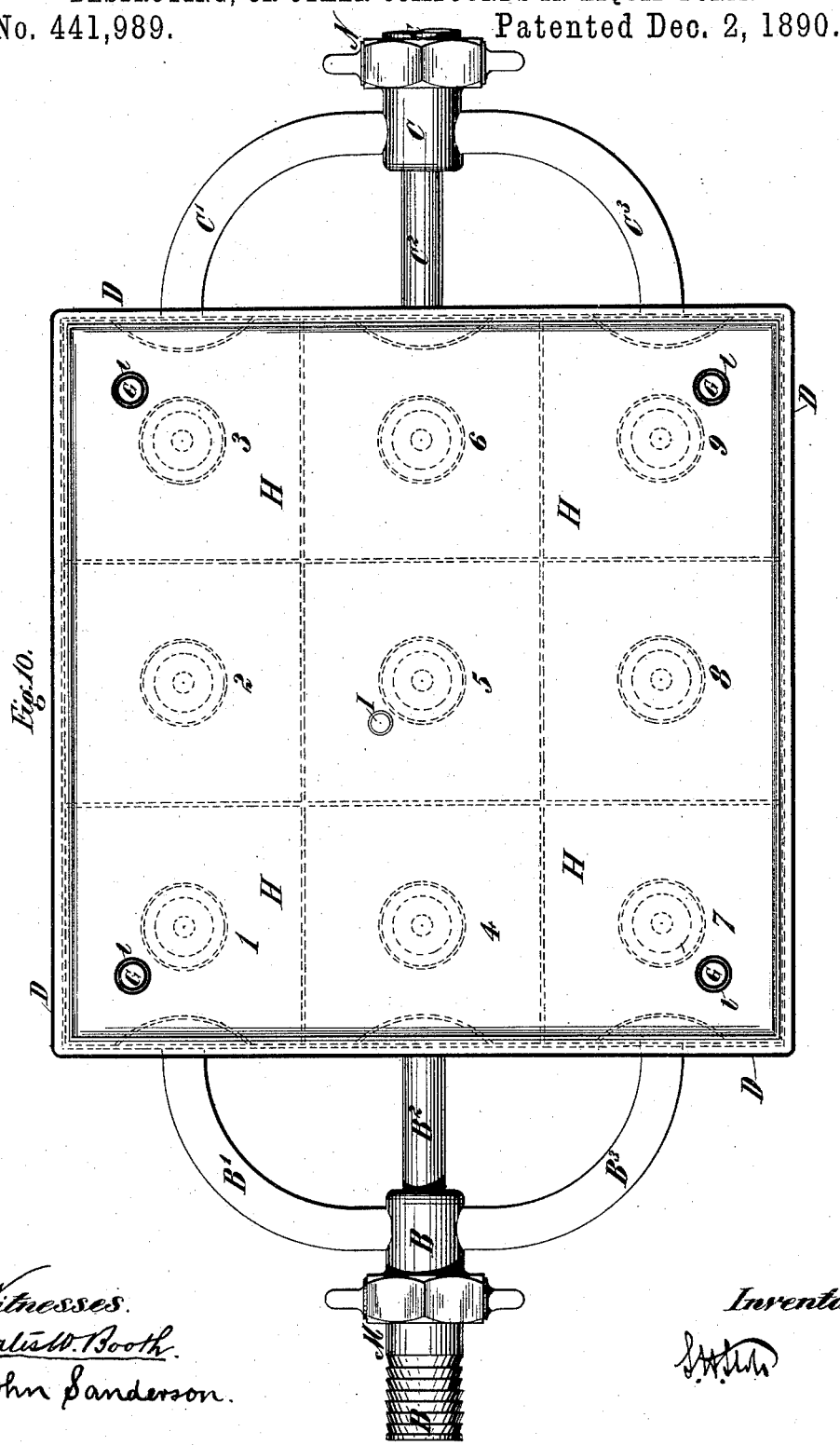

UNITED STATES PATENT OFFICE.

SAMUEL HOWARD STOTT, OF FULWOOD, ENGLAND.

APPARATUS FOR DIFFUSING UPON PLANTS FERTILIZING, INSECT-DESTROYING, OR OTHER COMPOUNDS IN LIQUID FORM.

SPECIFICATION forming part of Letters Patent No. 441,989, dated December 2, 1890.

Application filed May 13, 1890. Serial No. 351,659. (No model.)

*To all whom it may concern:*

Be it known that I, SAMUEL HOWARD STOTT, a subject of the Queen of Great Britain and Ireland, residing at Fulwood, Preston, in the county of Lancaster, England, have invented certain new and useful Improvements in Apparatus for Diffusing upon Plants Fertilizing, Insect-Destroying, or other Compounds in Liquid Form, of which the following is a specification.

This invention has for its object to provide an apparatus for diffusing upon plants fertilizing, insect-destroying, or other compounds in liquid form. With this object I employ a hollow box or vessel of any convenient shape, one end whereof is open to an inlet pipe or pipes and the other to an outlet-pipe. The inlet pipe or pipes is or are connected by means of any suitable coupling to a flexible hose-pipe, through which water under pressure is supplied to the interior of the box or vessel, and to the outlet-pipe may be connected in like manner any suitable form of nozzle or spray pipe for discharging and distributing the contents of the vessel. I place within the box or vessel divisions or walls of wire-gauze or perforated sheet metal, and so form one, two, or more cells or chambers, in which the fertilizing, insect-destroying, or other compound is placed, suitable openings being provided for the introduction of the material into the said cells or chambers. These openings are fitted with nipples having screw-down caps or with any other convenient arrangement for preventing the escape thereout of the contents of the said cells or chambers or of the water passing through under pressure, as aforesaid, when the apparatus is in work. The water under pressure, having been admitted to the box or vessel through a regulating tap or cock, passes through the cells or chambers containing the fertilizing, insect-destroying, or other compound, and by its friction thereupon disintegrates and mixes with the compound, and, passing through the nozzle or spray pipe at the other end of the box or vessel, is diffused upon the plants in its impregnated condition.

When the apparatus is made in the larger sizes, so as to be too large to be conveniently carried about by the hand while the spray is being diffused or directed upon the plants, the spray-pipe and nozzle, instead of being connected directly to the outlet-pipe of the apparatus, may be connected to one end of a length of flexible tubing or hose-pipe by means of any suitable coupling, the other end of which is connected in a similar manner to the outlet-pipe of the apparatus.

Any suitable liquid compound or material of a semi-solid, granulated, or pulverulent kind, suitable either for the nutrition of the plants or the destruction of insects, may be employed in conjunction with the apparatus above described.

I prefer to use an apparatus containing three or more cells or chambers.

The several cells or chambers of the apparatus may be charged, if desired, with materials or compounds of different kinds. For instance, one or more of the cells may be charged with solid manure, (soluble in water,) one or more with soot, and the remaining cell or cells with charcoal, the resulting impregnated liquid constituting a fertilizing-liquid. In like manner a mixture of paraffine and soft soap for destroying insect pests may be placed in one or more of the cells and sulphate of potassium for destroying mildew in others, and so on, as may be desired.

In practice it is found desirable when charging the cells or chambers of the apparatus with the impregnating material to only about half fill the said cells or chambers therewith. If the cells or chambers contain too large a quantity or bulk of the said material, the passage of the water through the apparatus is thereby obstructed or retarded, thus causing a weakening of the water-pressure necessary for the discharge of the contents of the apparatus in the form of spray.

In order that my said invention may be more clearly understood and carried into effect the accompanying drawings are added.

Figure 1 is a side elevation, and Fig. 2 a vertical longitudinal section, of apparatus of cylindrical form constructed in accordance with my said invention. Figs. 3 and 4 show in end view two of the walls or divisions of the hollow box or vessel when cylindrical.

Fig. 5 is a vertical longitudinal section, and Fig. 6 a plan view, partly in section, of apparatus rectangular in form constructed in accordance with my said invention. Figs. 7 and 8 show in end view two of the walls or divisions of the hollow box or vessel when rectangular. Fig. 9 is a sectional elevation of apparatus of rectangular form, in which the semi-solid, granulated, or pulverulent substance may by means of one push-plate, if the arrangement last hereinbefore mentioned is adopted, be fed or gradually forced down into each of the several chambers of the box or vessel below simultaneously. Fig. 10 is a sectional plan view of the same taken at the line A B, Fig. 9.

In Figs. 1 and 2, A represents a hollow box or vessel of cylindrical form, constructed with four cells or chambers, B an inlet-pipe, and C an outlet-pipe. M and N are couplings of ordinary construction for the connection thereto of a flexible tube or hose-pipe. $a, b, c$, and $d$ are walls or plates of sheet metal, forming the vertical sides of the cells or chambers 1, 2, 3, and 4, into which the box or vessel A is divided. $e\ e\ e$ are nipples, (having screw-down caps $f\ f\ f$,) through which the compound or material is introduced into the cells or chambers 1, 2, and 3, the screw-threading of the nipples $e\ e\ e$ accommodating, when desired, the attachment thereto of a reservoir or holder. The chamber 4, being the one next before the outlet, is preferably without a nipple and cap, being designed to promote the more effectual mixing of the materials from the chambers 1 2 3 with the water passing through the apparatus. $h$ represents a perforated sheet-metal shield or grid, designed to strain the impregnated liquid as it issues from the outlet end $o$ of the apparatus. The outlet-end part $o$, as also the inlet-end part $i$, may, if desired, be made to screw onto the ends of the box or vessel A, so as to be detachable therefrom, and thereby facilitate the removal of impurities or obstructive matter accumulated in front either of the strainer $h$ or the first division-plate $a$. The holes or perforations $j\ j$ in each of the division-plates $a\ b\ c\ d$ are preferably arranged in an alternate manner, as shown at Figs. 3 and 4 and also at Fig. 2—that is to say, the said holes are pierced through one plate $a$ near its outer part or edge (see Fig. 3) and through the next plate $b$ near its inner or central part. (See Fig. 4.) In practice it is found advantageous to pierce the first plate $a$ with a few additional holes near its central part (see Fig. 3) for the purpose of relieving somewhat the said central part of the plate $a$ from the initial or full pressure of the incoming water.

In Figs. 5 and 6, A represents a hollow box or vessel of rectangular form constructed with three parallel rows of cells or chambers, each of the rows of cells or chambers having a separate inlet and outlet pipe. The three inlet-pipes $B'\ B^2\ B^3$ branch out from a common or main inlet-pipe B, and the three outlet-pipes $C'\ C^2\ C^3$ converge into a common or main outlet-pipe C, the said main inlet and outlet pipes B and C being provided with couplings M and N, with which to connect flexible tubing or hose-pipe, as hereinabove described with reference to Figs. 1 and 2. The arrangement, however, of the apparatus shown at Figs. 5 and 6 (and also at Figs. 9 and 10) permits of either end of the apparatus being used as the inlet or as the outlet end. $a\ b$ and $c\ d$ are dividing-walls of the cells or chambers 1 2 3. All the cells or chambers of the three rows preferably communicate with each other through holes $j\ j$ in the dividing-walls $a\ b$ and $c\ d$; but the said holes may advantageously be arranged near the upper part of one plate $a$ (see Fig. 7 and also Fig. 9) and near the lower part of the opposite plate $b$. (See Fig. 8.) $e\ e\ e$ are nipples, $f\ f\ f$ screw-down caps, and $h\ h\ h$ strainers for the like purposes as the corresponding parts hereinabove referred to and shown at Figs. 1 and 2.

The arrangement of apparatus illustrated at Figs. 9 and 10 comprises a hollow box or vessel A, of rectangular form, having cells or chambers and inlet and outlet pipes arranged as shown at and described with reference to Figs. 5 and 6, the said box or vessel, however, being so constructed that each of its cells or chambers is in communication with the interior of a single reservoir or holder. D represents the body or box part of the said reservoir or holder, which has a number (in the arrangement shown in the said Figs. 9 and 10 the number being nine) of tapered or funnel-mouthed outlet-openings E E E, which enter holes in the top of the cells or chambers. F is the cover; G G, guide rods or fingers; H, a push-plate, and $l\ l\ l$ spiral springs. The cover F may be fastened down in place on the box D by a screw-bolt I and a nut J, the said bolt and nut also serving to hold the upper part D and the lower part A together, suitable washers or packings (not shown in the drawings) being interposed between the said parts, so that the required water-tight joints may be formed between them.

At Figs. 9 and 10 is shown (at K K) an arrangement which it is advisable to adopt when the supplementary reservoir or holder fitted with a push-plate is used in conjunction with my said invention. This consists of a vertical tube of perforated sheet metal or wire-gauze, forming a kind of cage inside the cell or chamber, within which the compound or material employed is held or supported in a manner suitable for being effectively acted upon by the friction of the passing water, thus avoiding the danger of the cell or chamber being filled too rapidly or to such an extent as to retard the passage of the water through the apparatus. This arrangement may, if desired, be employed in conjunction with the apparatus shown at Figs. 5 and 6, and with a slight modification with that shown at Figs. 1 and 2, independently of the said push-plate arrangement above described.

What I claim is—

1. An apparatus for the purpose specified, comprising a vessel containing two or more cells provided with charging-apertures and separated by perforated walls or partitions, inlet and outlet pipes in communication with the end cells, a perforated shield or strainer arranged at the inner end of the outlet-pipe, and pipe-couplings applied to the inlet and outlet pipes, substantially as herein described, for the purpose set forth.

2. An apparatus for the purpose specified, comprising a vessel A, divided into cells 1 2 by perforated walls or plates $b$ $c$ and provided with charging openings or nipples $e$, inlet and outlet pipes B and C in communication with the first and last cells, a perforated plate $a$ at the entrance end of the first cell, a perforated shield or strainer $h$ at the outlet end of the last cell, and pipe-couplings applied to the inlet and outlet pipes, substantially as herein described, for the purposes set forth.

3. In an apparatus for the purpose specified, a vessel A, divided longitudinally and transversely into cells by perforated walls $a$ $b$ $c$ $d$, said cells having charging-openings, and the first and last cells of each longitudinal row of cells having inlet and outlet pipes in communication therewith and provided with perforated shields or strainers, the several inlet-pipes being connected to a common or main inlet-pipe and the several outlet-pipes being connected to a common or main outlet-pipe, substantially as herein described.

In testimony whereof I have signed my name to this specification in the presence of two subscribing witnesses.

SAMUEL HOWARD STOTT.

Witnesses:
YATES W. BOOTH,
30 *Guildhall Street, Preston, England.*
JOHN SANDERSON,
27 *Beech Street, Preston, England.*